US010185461B2

(12) United States Patent
Yamada et al.

(10) Patent No.: US 10,185,461 B2
(45) Date of Patent: Jan. 22, 2019

(54) INFORMATION PROCESSING APPARATUS, INFORMATION PROCESSING METHOD AND NON-TRANSITORY COMPUTER READABLE MEDIUM

(71) Applicant: FUJITSU TEN LIMITED, Kobe-shi, Hyogo (JP)

(72) Inventors: Shuji Yamada, Kobe (JP); Kaori Honda, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 111 days.

(21) Appl. No.: 15/385,014

(22) Filed: Dec. 20, 2016

(65) Prior Publication Data

US 2017/0185238 A1 Jun. 29, 2017

(30) Foreign Application Priority Data

Dec. 25, 2015 (JP) ................................ 2015-255064

(51) Int. Cl.

| | |
|---|---|
| ***G06F 3/0481*** | (2013.01) |
| ***B60K 37/06*** | (2006.01) |
| ***B60K 35/00*** | (2006.01) |
| ***G06F 3/0482*** | (2013.01) |
| ***G06F 3/0488*** | (2013.01) |

(Continued)

(52) U.S. Cl.

CPC ............ *G06F 3/0481* (2013.01); *B60K 35/00* (2013.01); *B60K 37/06* (2013.01); *G06F 3/0482* (2013.01); *G06F 3/04847* (2013.01); *G06F 3/04886* (2013.01); *B60K 2350/1004* (2013.01); *B60K 2350/1032* (2013.01); *B60K 2350/1044* (2013.01); *B60K 2350/1076* (2013.01); *B60K 2350/1096* (2013.01);

(Continued)

(58) Field of Classification Search

CPC .................................................... G06F 3/0481
USPC ......................................................... 715/766
See application file for complete search history.

(56) References Cited

U.S. PATENT DOCUMENTS 9,553,967 B2 * 1/2017 Langlois ............ H04M 1/6091
2008/0094421 A1 * 4/2008 Maeda ................. G06F 3/0481
345/661

(Continued)

FOREIGN PATENT DOCUMENTS

JP 2008-024070 A 2/2008
JP 2008-051743 A 3/2008

(Continued)

*Primary Examiner* — William D Titcomb
(74) *Attorney, Agent, or Firm* — Oliff PLC

(57) ABSTRACT

An information processing apparatus including: a control unit to generate a display image including running images of one or more applications each containing one or more operation device images attaining predetermined functions; an output unit to display the display image generated by the control unit; and an input unit to accept an operation performed on the operation device image contained in the running image, wherein the control unit extracts the functions associated with the operation device images equal to or smaller than a predetermined maximum count and contained in the running image of the application, based on priority levels of the functions associated with the operation device images contained in one or more applications, and generates the display image including the running image containing the operation device images associated with the extracted functions.

6 Claims, 13 Drawing Sheets

OPERATION BUTTON
121-1
121-2
OPERATION BUTTON
OPERATION BUTTON
OPERATION BUTTON
OPERATION BUTTON
OPERATION BUTTON
121-3
111 OPERATION BUTTON
121-4
101

(51) Int. Cl.
*G06F 3/0484* (2013.01)
*G06F 3/0485* (2013.01)

(52) U.S. Cl.
CPC ........................... *B60K 2350/2013* (2013.01); *B60K 2350/352* (2013.01); *G06F 3/0485* (2013.01); *G06F 3/0488* (2013.01)

(56) References Cited

U.S. PATENT DOCUMENTS

2011/0106367 A1 5/2011 Oda et al.
2014/0277843 A1* 9/2014 Langlois ............. H04M 1/6091 701/2
2014/0309870 A1* 10/2014 Ricci ....................... H04W 4/21 701/36
2017/0115828 A1* 4/2017 Langlois ............... H04W 76/10

FOREIGN PATENT DOCUMENTS

JP 2009-090690 A 4/2009
JP 2010-036871 A 2/2010
JP 2011-093463 A 5/2011

* cited by examiner

CONTROL UNIT
11
STORAGE UNIT
12
INPUT UNIT
13
OUTPUT UNIT
14
COMMUNICATION UNIT
15
INFORMATION PROCESSING APPARATUS
10

1
INFORMATION PROCESSING APPARATUS
10
AUDIO SYSTEM
20
AIR CONDITIONING SYSTEM
30
NAVIGATION SYSTEM
40

FIG. 8

| PRIORITY LEVEL | APPLICATION |
| --- | --- |
| 5 | NAVIGATION |
| 4 | AUDIO |
| 3 | HANDS-FREE PHONE |
| 2 | SNS |
| ... | ... |

| NAVIGATION | | |
|---|---|---|
| FUNCTION | *1 | *2 |
| DESTINATION SEARCH | 5 | ○ |
| POI INDICATION | 4 | ○ |
| MAP SCROLL | 5 | – |
| SCALE-UP | 3 | – |
| SCALE-DOWN | 3 | – |
| INDICATION OF CURRENT PLACE | 5 | – |
| SWITCHOVER OF VIEW POINT | 1 | – |

| HANDS-FREE PHONE | | |
|---|---|---|
| FUNCTION | *1 | *2 |
| SPEED DIAL A | 5 | – |
| SPEED DIAL B | 5 | – |
| SPEED DIAL C | 2 | – |
| REDIAL | 5 | – |
| HISTORY CALL | 2 | – |

| AUDIO | | |
|---|---|---|
| FUNCTION | *1 | *2 |
| TRACK UP | 5 | – |
| TRACK DOWN | 5 | – |
| PLAY/MUTE | 4 | – |
| LIST CALL | 1 | ○ |

| SNS | | |
|---|---|---|
| FUNCTION | *1 | *2 |
| CONTENT UP | 5 | – |
| CONTENT DOWN | 5 | – |
| LIKE | 2 | – |
| LIST CALL | 1 | ○ |

*1 PRIORITY LEVEL
*2 TRAVELLING REGULATION TARGET

T200

(WHOLE OPERATION MEANS)
NAVIGATION
*1
5
*4
1
*2
4
SCROLL
5
SCALE-UP
3
*5
5
*3
3
DISPLAY IMAGE
RUNNING IMAGE
FREE SPACE
*1 SETTING OF DESTINATION
*2 INDICATION OF POI
*3 SCALE-DOWN
*4 SWITCHOVER OF VIEW POINT
*5 CURRENT PLACE
RUNNING IMAGE
FREE SPACE
(AFTER EXTRACTION)
NAVIGATION
*1
*4
*2
SCROLL
SCALE-UP
*5
*3
DISPLAY IMAGE

INFORMATION PROCESSING APPARATUS, INFORMATION PROCESSING METHOD AND NON-TRANSITORY COMPUTER READABLE MEDIUM

CROSS-REFERENCE TO RELATED APPLICATION

This application is based upon and claims the benefit of priority of the prior Japanese Patent Application No. 2015-255064 filed on Dec. 25, 2015, the entire contents of which are incorporated herein by reference.

TECHNICAL FIELD

The present invention pertains to an information processing apparatus, an information processing method, and an information processing program.

BACKGROUND ART

An information processing apparatus having a built-in display equipped with a touch panel and other equivalent devices has hitherto been installed within a vehicle in order to display an operation image of an audio system, an operation image of an air conditioning system and an image of navigation to a destination by a navigation system, which are mounted on the vehicle. A driver of the vehicle operates the on-vehicle systems and grasps a present position by referring to the images displayed on the display (on-vehicle display). The information processing apparatus (on-vehicle apparatus) installed on the vehicle is preinstalled with an Operating System (OS) universally used on a mobile terminal, a tablet terminal and other equivalent terminals, whereby there can be run a variety of applications other than the operation images of the audio system and other equivalent systems.

DOCUMENTS OF PRIOR ARTS

Patent Document

[Patent document 1] Japanese Patent Application Laid-Open Publication No. 2008-051743

[Patent document 2] Japanese Patent Application Laid-Open Publication No. 2011-093463

SUMMARY OF THE INVENTION

Problems to be Solved by the Invention

According to Human Machine Interface (HMI) specifications for the on-vehicle display utilizing Widget properties of an Android OS defined as one of universal OSs, it is a main scheme that the display image containing running images of Widget applications is displayed on a background image (plane background) of one page. The running image of the Widget application to be displayed is an image containing at least one of output images for displaying information generated by the application and input images instanced by virtual buttons for inputting the information to the application. An operation image of an audio system, an operation image of an air conditioning system and an image for navigation to a destination by a navigation system, are each one example of the running image of the application.

When operation means images of a multiplicity of virtual buttons and other equivalent elements are displayed in the running image of the application, a user may get confused, with the result that a problem will be caused in driving safety. Under such circumstances, a number of displayable operation means images is restricted as the case may be. In the case of one running image of the application to be displayed, even when restricting the number of the displayable operation means images, it is easy to predetermine the operation means images to be displayed in the running image. However, according to the foregoing specifications for the apparatus, the user can lay out the running images of an arbitrary combination of the applications in the display image, and it is therefore difficult to predetermine the operation means images to be displayed in the case of restricting the number of the displayable operation means images in all combinations of the applications. It is also difficult to properly select the operation means images to be displayed by being matched with the combination of the applications to be displayed when the running images of the plurality of applications are displayed on one screen.

The present invention aims at providing an information processing apparatus configured to properly select operation means images to be displayed corresponding to a running image of an application to be displayed.

Means for Solving the Problems

The following means are adopted for solving the problems described above. To be specific, according to a first aspect, there is provided an information processing apparatus comprising: a control unit to generate a display image including running images of one or more applications each containing one or more operation means images attaining predetermined functions; an output unit to display the display image generated by the control unit; and an input unit to accept an operation performed on the operation means image contained in the running image, wherein the control unit extracts the functions associated with the operation means images equal to or smaller than a predetermined maximum count and contained in the running image of the application, based on priority levels of the functions associated with the operation means images contained in one or more applications, and generates the display image including the running image containing the operation means images associated with the extracted functions.

The aspect of the disclosure may be attained by causing the information processing apparatus to run a program. To be specific, a configuration of the disclosure can be specified as a program for causing the information processing apparatus to implement processes to be executed by respective means according to the aspect described above, or as a non-transitory computer readable recording medium on which the program is recorded. The configuration of the disclosure may also be specified as a method by which the information processing apparatus implements the processes to be executed by the respective means described above. The configuration of the disclosure may further be specified as a system including the information processing apparatus implementing the processes to be executed by the respective means described above.

Effects of the Invention

According to the present invention, it is feasible to provide the information processing apparatus configured to properly select the operation means images to be displayed corresponding to the running image of the application to be displayed.

BRIEF DESCRIPTION OF THE DRAWINGS

FIG. 8 is a diagram illustrating an example of an application priority level table.

FIG. 9 is a diagram illustrating an example of a function priority level table indicating a relationship between functions and priority levels with respect to the applications.

DESCRIPTION OF EMBODIMENTS

An embodiment will hereinafter be described with reference to the drawings. A configuration of the embodiment is an exemplification, and a configuration of the invention is not limited to the specific configuration of the embodiment of the disclosure. Implementation of the invention may involve properly adopting the specific configuration corresponding to the embodiment.

[Embodiment]

A plurality of applications runs on an information processing apparatus mounted on a vehicle according to the embodiment. Running images of the plurality of applications to be executed are displayed on a display of the information processing apparatus. The running images of the applications to be displayed on the display are displayed in superposition on predetermined background images. A user of the information processing apparatus is instanced by a driver of the vehicle mounted with the information processing apparatus.

(Example of Configuration)

<System Configuration>

Figure 1:
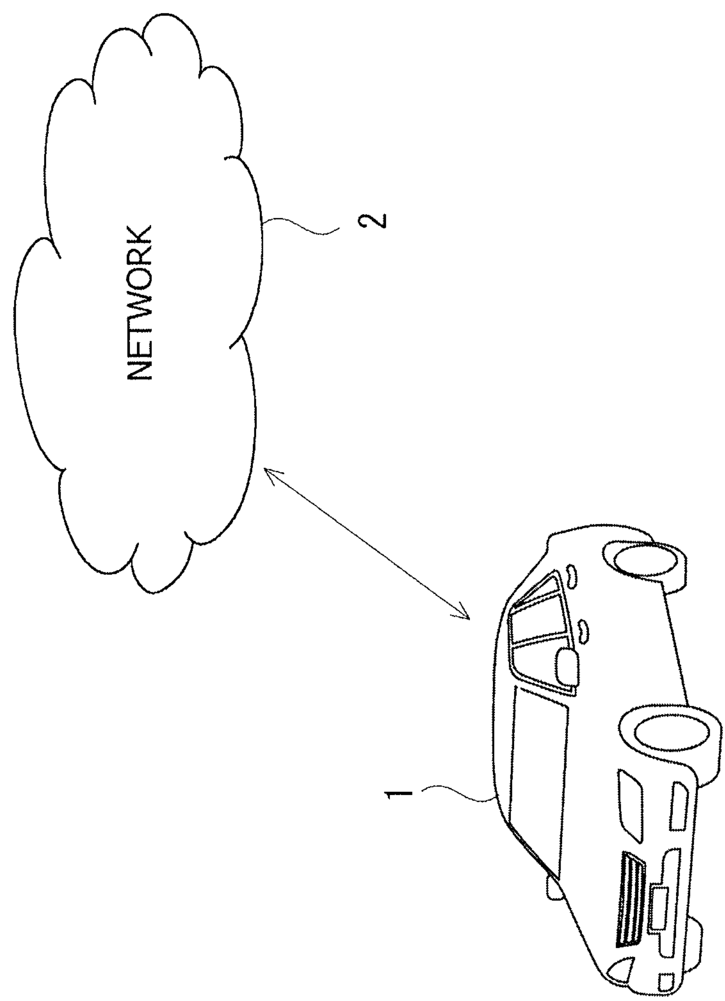
FIG. 1 is a view illustrating an example of a system configuration according to an embodiment.

FIG. 1 is a view illustrating an example of a system configuration according to the embodiment. The system in FIG. 1 includes a vehicle 1 mounted with the information processing apparatus, and a network 2. The information processing apparatus mounted on the vehicle 1 is connected via the network 2 to another information processing apparatus (unillustrated) and other equivalent apparatuses, which are connected to the network 2.

The network 2 is exemplified by an Internet line using, e.g., line networks for mobile phones. The information processing apparatus mounted on the vehicle 1 is operated by the driver of, e.g., the vehicle 1. The network 2 may be a network including an access network to a communication device of an Internet provider and the Internet. The access network to the communication device of the Internet provider is exemplified by optical networks, Asymmetric Digital Subscriber Line (ADSL) and other equivalent networks provided by communication common carriers. The network 2 is one example of "a public wireless network".

Figure 2:
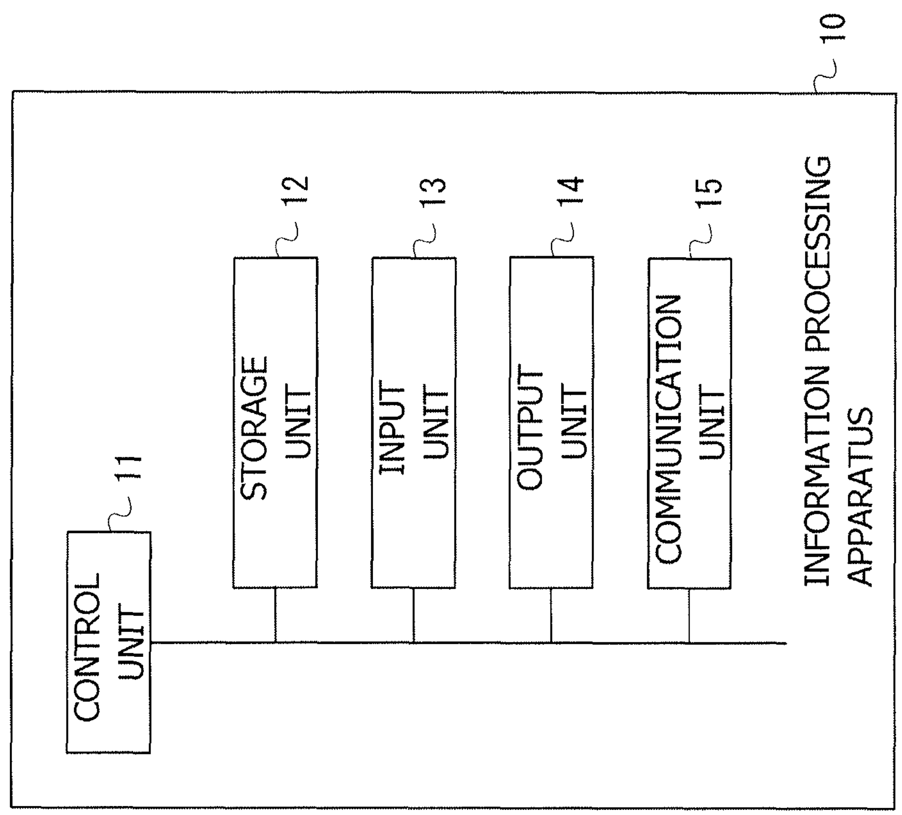
FIG. 2 is a diagram illustrating an example of a configuration of an information processing apparatus mounted on a vehicle.

FIG. 2 is a diagram illustrating an example of a configuration of the information processing apparatus mounted on the vehicle. An information processing apparatus 10 in FIG. 2 includes a control unit 11, a storage unit 12, an input unit 13, an output unit 14 and a communication unit 15. The information processing apparatus 10 is operated by the driver and other equivalent persons who drive the vehicle 1.

The control unit 11 executes processes functioning as the information processing apparatus 10 according to computer programs deployed in an executable manner on the storage unit 12 and other equivalent storages. The processes functioning as the information processing apparatus 10 include, e.g., a variety of information processes on the vehicle 1. The control unit 11 controls, based on an instruction and other equivalent indications of a user, an audio system and other equivalent systems connected to the information processing apparatus 10. The control unit 11 displays predetermined images on the display of the output unit 14.

The storage unit 12 stores the computer programs (for running the applications) executed by the control unit 11, or data, tables and other equivalent software components used by the control unit 11. The data contain the background images, icon images associated with the applications and other equivalent images, which are displayed on the display.

The input unit 13 is instanced by a touch panel, push buttons, a keyboard, a pointing device, a microphone and a camera, and accepts a user's operation.

The output unit 14 is instanced by a display to output the images and character information. The display is configured integrally with the touch panel of the input unit 13.

The communication unit 15 performs communications via the network 2 with other apparatuses on the network 2. The network 2 is the line network for the mobile phones, in which case the communication unit 15 establishes a connection to the network 2 via a base station of the line network for the mobile phones. The communication unit 15 connects to the audio system, an air conditioning system, a navigation system and other equivalent systems within the vehicle 1. The communication unit 15 connects to the vehicle 1 itself and is thereby enabled to acquire a state of the vehicle 1. The state of the vehicle 1 is, e.g., information indicating whether the vehicle 1 currently travels.

Figure 3:
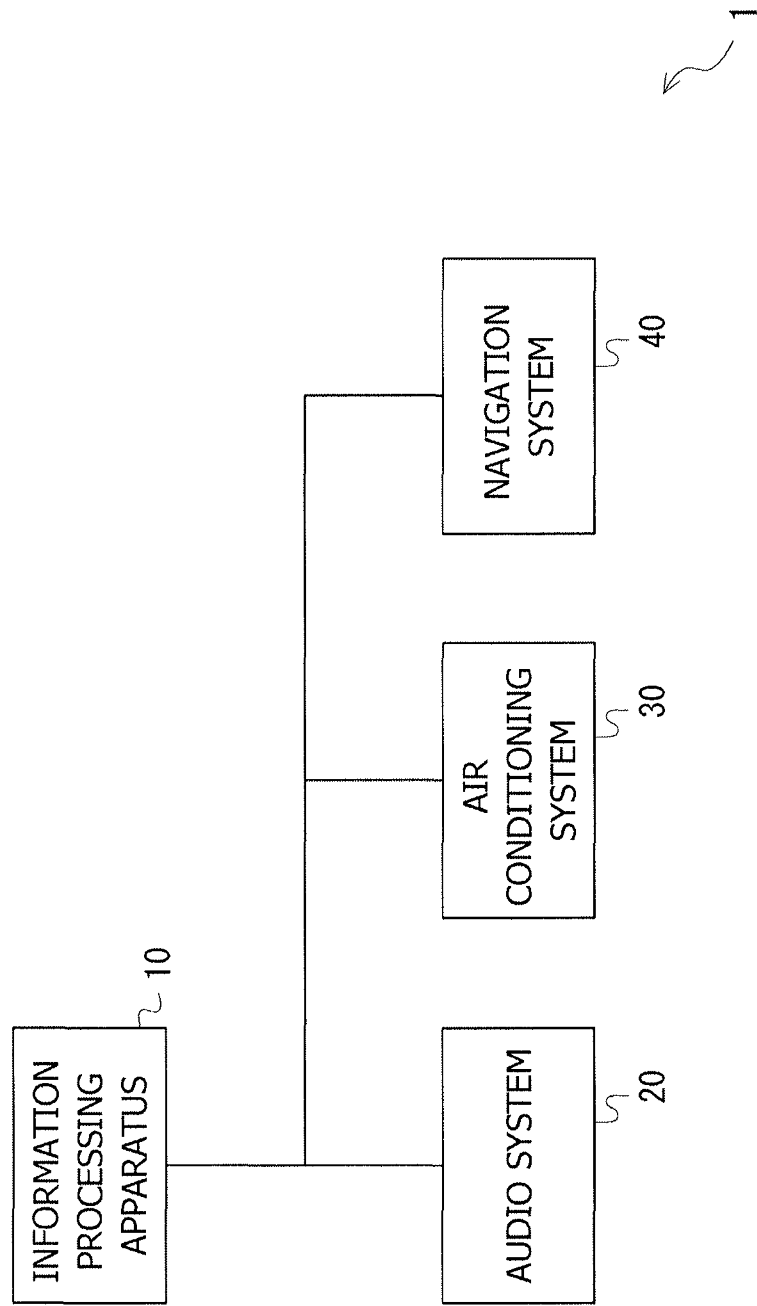
FIG. 3 is a diagram illustrating an example of a configuration of the information processing apparatus mounted on the vehicle.

FIG. 3 is a diagram illustrating an example of a configuration of the apparatus mounted on the vehicle. The vehicle 1 in FIG. 3 is mounted with the information processing apparatus 10, an audio system 20, an air conditioning system 30 and a navigation system 40. The audio system 20, the air conditioning system 30 and the navigation system 40 are connected to the information processing apparatus 10. The vehicle 1 may also be mounted with other apparatuses and systems. The information processing apparatus 10 can control the audio system 20, the air conditioning system 30 and the navigation system 40. The information processing apparatus 10, the audio system 20, the air conditioning system 30 and the navigation system 40 may also be configured integrally into one on-vehicle apparatus.

The audio system 20 includes an output unit instanced by a loudspeaker, reproduces sounds and voices stored in a variety of storage mediums, and outputs the reproduced sounds and voices to the output unit. The audio system 20 may include a broadcast receiving unit, a disk reproducing unit and other equivalent units. The broadcast receiving unit selectively receives a broadcast wave having a specific frequency from the broadcast waves received by an antenna, and outputs sound/voice signals of the selected broadcast by demodulating the received broadcast wave. A recording medium reproducing unit picks up and reads the data stored on the recording medium, and outputs the sound/voice signals based on the data being read therefrom. The recording medium encompasses, e.g., a Compact Disk (CD), a Digital Versatile Disc (DVD), a Secure Digital (SD) memory card and other equivalent mediums.

The air conditioning system 30 includes an air conditioning equipment, a temperature measurement unit and other equivalent units, and adjusts an air temperature and a humidity in the vehicle 1, based on indoor/outdoor air temperatures of the vehicle 1.

The navigation system 40 includes a Global Positioning System (GPS) receiver to receive radio waves from a GPS satellite, and calculates a current position (a latitude, a longitude and other equivalent geographical coordinates), time and other equivalent values. It does not, however, mean that the navigation system is limited to the system including the GPS receiver. The navigation system 40 stores map information.

The information processing apparatus 10 and the navigation system 40 can be each attained by using a dedicated or general-purpose computer instanced by a Personal Computer (PC), a smartphone, a mobile phone, a tablet terminal, an on-vehicle apparatus and a Personal Digital Assistant (PDA), or using an electronic equipment mounted with the computer.

Figure 4:
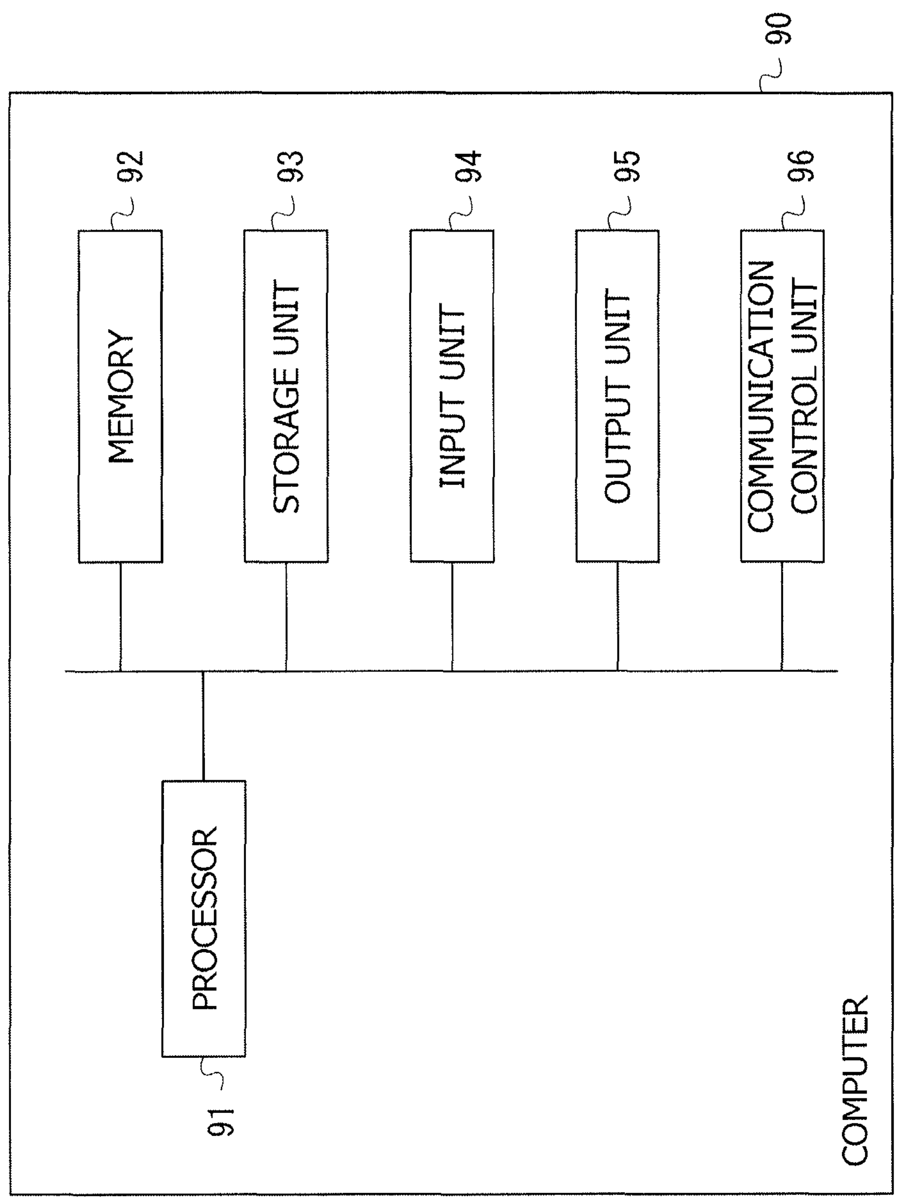
FIG. 4 is a diagram illustrating an example of a hardware configuration of a computer.

FIG. 4 is a diagram illustrating an example of a hardware configuration of the computer. A computer 90 illustrated in FIG. 4 has a configuration of the general computer. The computer 90 in FIG. 4 includes a processor 91, a memory 92, a storage unit 93, an input unit 94, an output unit 95 and a communication control unit 96. These units are interconnected via a bus. The memory 92 and the storage unit 93 are non-transitory computer readable recording mediums. The components of the hardware configuration of the computer may be properly omitted, replaced and added without being limited to the example illustrated in FIG. 4.

The processor 91 loads the programs stored on the recording medium onto work areas of the memory 92, and the respective component units are controlled through running the programs, whereby the computer 90 is enabled to attain functions matching with predetermined purposes.

The processor 91 is instanced by a Central Processing Unit (CPU) and a Digital Signal Processor (DSP). The processor 91 performs calculations of a variety of information processing tasks by controlling the computer 90.

The memory 92 includes, e.g., a Random Access Memory (RAM) and a Read Only Memory (ROM). The memory 92 is also called a main storage device.

The storage unit 93 is instanced by an Erasable Programmable ROM (EPROM) and a Hard Disk Drive (HDD). The storage unit 93 can include a removable medium, i.e., a portable recording medium. The removable medium is a disk recording medium instanced by a Universal Serial Bus (USB) memory, a Compact Disc (CD), or a Digital Versatile Disc (DVD). The storage unit 93 is also called a secondary storage device.

The storage unit 93 stores various categories of programs, various items of data and various types of tables in a readable/writable manner. The storage unit 93 stores an Operating System (OS), the various categories of programs, the various types of tables and other equivalent software components. The information stored on the storage unit 93 may also be stored on the memory 92. In turn, the information stored on the memory 92 may also be stored on the storage unit 93.

The OS is software that acts as an intermediary between the software and the hardware, manages a memory space, manages files, and also manages processes and tasks. The OS includes a communication interface. The communication interface is a program for transferring and receiving the data to and from other external apparatuses and devices connected via a communication control unit 1012. The external apparatuses and devices include, e.g., other information processing apparatuses and external storage devices.

The input unit 94 includes the keyboard, the pointing device, a wireless remote controller, the touch panel, the push buttons and other equivalent devices. The input unit 94 can include an input device like a camera to input videos and images, and an input device like a microphone to input sounds/voices.

The output unit 95 includes a display device instanced by a Liquid Crystal Display (LCD), an Electroluminescence (EL) panel, a Cathode Ray Tube (CRT) display and a Plasma Display Panel (PDP), and an output device instanced by a printer. The output unit 95 can include a sound/voice output device instanced by a loudspeaker.

The communication control unit 96 controls the communications between the computer 90 and other devices by being connected to other devices. The communication control unit 96 is exemplified by a Local Area Network (LAN) interface board, a wireless communication circuit for wireless communications, and a communication circuit for telephone communications. The LAN interface board and the wireless communication circuit are connected to a network instanced by the Internet.

A series of processes to be executed by the computer 90 can be executed hardwarewise and softwarewise as well.

Steps for writing a program include, of course, processes performed in time-series along a described sequence, and also processes to be executed individually or in parallel without being necessarily processed in time-series. Part of the steps for writing the program may also be omitted.

OPERATIONAL EXAMPLE 1

An operational example of the information processing apparatus 10 according to the embodiment will be described. The information processing apparatus 10 is installed on the vehicle 1 and connected to the audio system 20, the air conditioning system 30, the navigation system 40 and other equivalent systems of the vehicle 1. The information processing apparatus 10 can be also connected to other information processing apparatuses and other equivalent apparatuses on the network 2. A plurality of applications runs on the information processing apparatus 10, and a whole image containing the running images of the applications is displayed on the display of the output unit 14. The running images of the applications are images containing at least one of a set of output images for displaying information generated by the applications, and a set of input images of virtual buttons used for inputting the information to the applications. The input image of the virtual button is an example of an image of an operation means. A specific example of the image of the operation means will be described later on. A general-purpose OS is run on the information processing apparatus 10, and the plurality of applications may also be run on the OS. The applications to be run on the information processing apparatus 10 are, e.g., Widget applications of Android OS.

Figure 5:
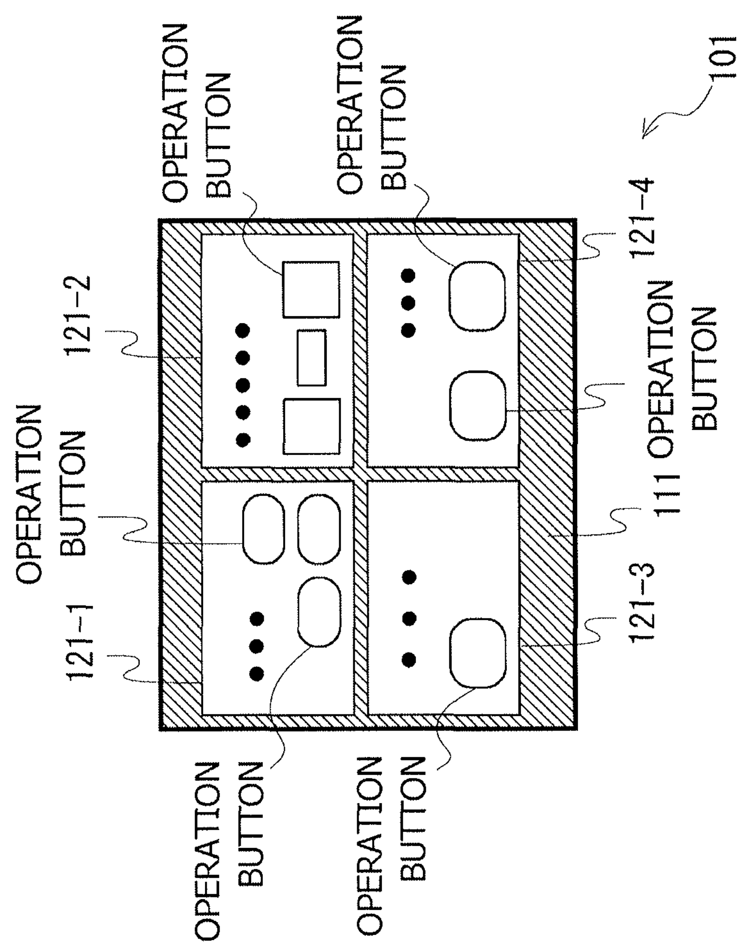
FIG. 5 is a diagram illustrating an example of an image containing a running windows of applications to be displayed on a display of an output unit of the information processing apparatus.

FIG. 5 is a diagram illustrating an example of the images inclusively of application running windows displayed on the display of the output unit of the information processing apparatus. In the example of FIG. 5, a whole image 101 displayed on the display of the output unit 14 of the information processing apparatus 10 contains a background image 111, and running images 121-1 through 121-4 of four applications. The background image 111 may be an image instanced by a graphic, a photo and other equivalent images, and may also be a one-color solid density image. The running images 121-1 through 121-4 of the four applications are rendered in superposition on the background image 111. The running image of each application contains one or more operation means images of the operation buttons that attain predetermined functions and other equivalent operations. The control unit 11 of the information processing apparatus 10 generates the running image for the application being run in active on the information processing apparatus 10, and displays the generated image on the display of the output unit 14. Herein, the whole image 101 displayed on the display of the output unit 14 of the information processing apparatus 10 can contain the running images of up to four categories of applications. In the whole image 101, a user of the information processing apparatus 10 can freely change positions to display the running images of the applications. Areas for two running images in the whole image 101 may also be set as an area for the running images of one application.

Figure 6:
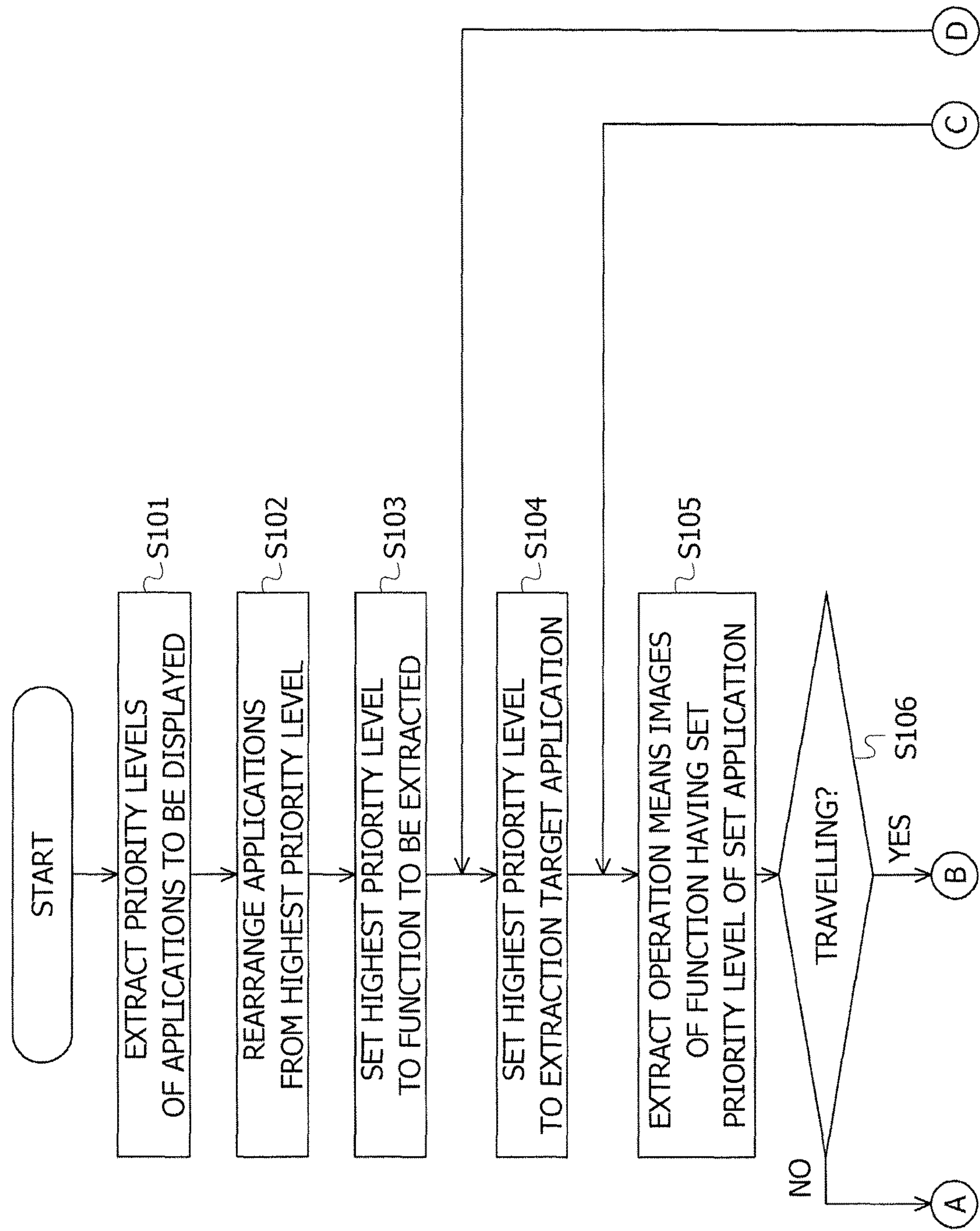
FIG. 6 is a flowchart illustrating an example of an operation flow (a half of the whole) for determining operation means images to be displayed in the information processing apparatus.
Figure 7:
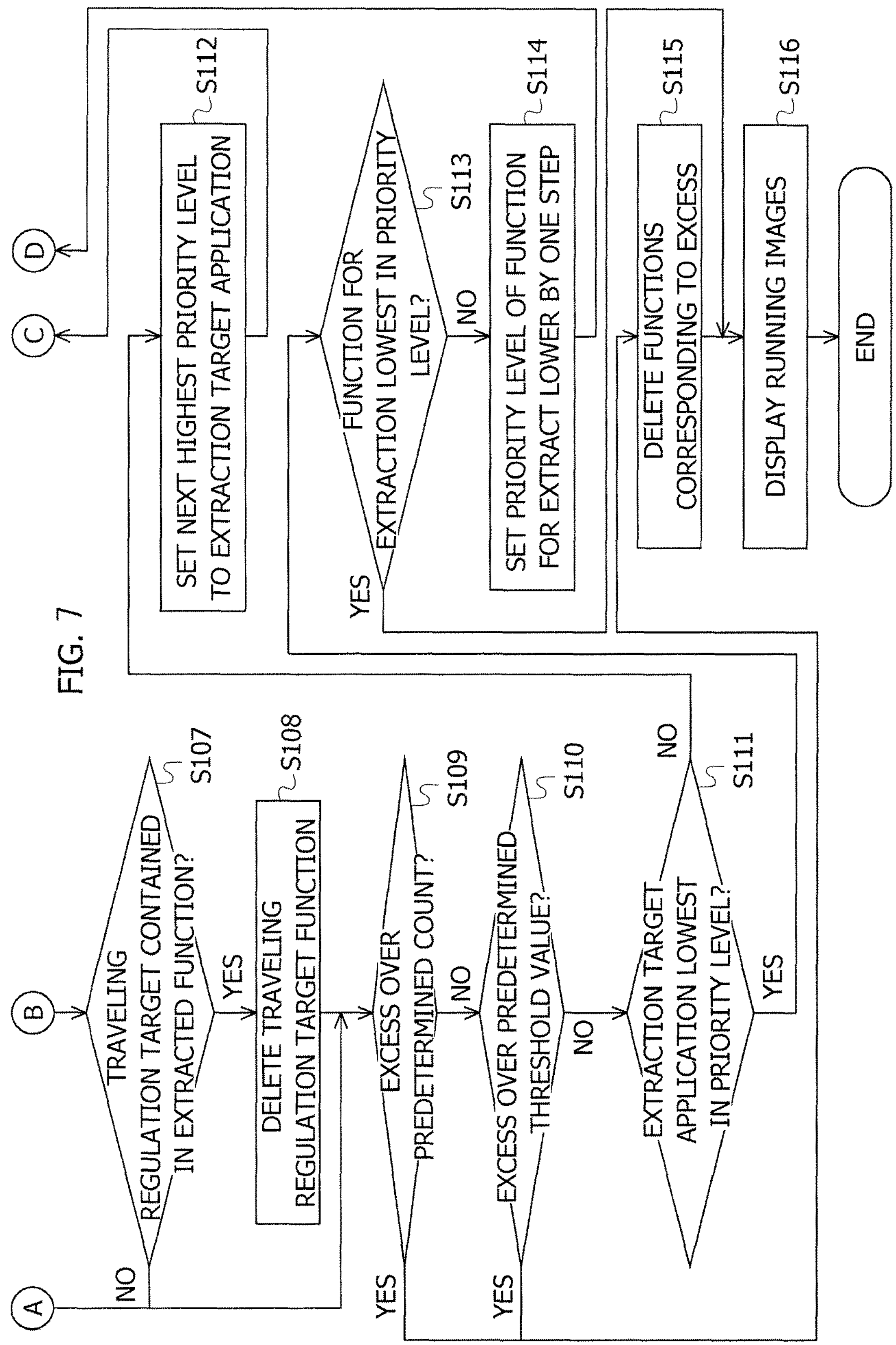
FIG. 7 is a flowchart illustrating an example of the operation flow (the remaining half) for determining the operation means images to be displayed in the information processing apparatus.

FIGS. 6 and 7 are flowcharts each illustrating an operation flow of how the operation means images displayed on the information processing apparatus are determined. Symbols A, B, C and D in FIG. 6 are connected respectively to A, B, C and D in FIG. 7. It is herein assumed that the plurality of applications runs on the image information processing apparatus 10, and the running images of the plurality of applications are allocated to one display image as in the whole image 101. A start of the operation flow in each of FIGS. 6 and 7 is triggered by newly starting up an application within one display image. Herein, when an additional new application is started in one display image, the information processing apparatus 10 extracts the operation means images to be displayed in the running images of the overall applications displayed in this one display image from a predetermined table, and redetermines the operation means images.

In S101, the control unit 11 of the information processing apparatus 10 extracts priority levels of the overall applications within the display image inclusively of the newly started application from an application priority level table T100. The priority level of the application is set high with respect to, e.g., the application that is to be operated preferentially for driving the vehicle 1. The priority levels of the applications are preset.

FIG. 8 is a diagram illustrating an example of the application priority level table. In the application priority level table T100 of FIG. 8, the priority levels are set lower from a navigation application down to an audio application, a hands-free phone application and a Social Network Service (SNS) application in this sequence. The navigation application is an application for displaying a map of a periphery of the present position and navigating the vehicle 1 to a destination. The audio application is an application for operating an audio equipment in the vehicle 1. The hands-free phone application is an application for chatting by phone with a chat partner outside the vehicle through a mobile phone without touching the mobile phone in a way that performs the communications between the information processing apparatus 10 and the mobile phone or other equivalent terminals possessed by the user. The SNS application is an application for displaying character information, image information and other equivalent information of the SNS. For example, the higher priority levels are allocated to the applications pertaining to driving the vehicle 1 and the applications pertaining to facilities of the vehicle 1. While on the other hand, the lower priority levels are allocated to the applications not highly pertaining to the vehicle 1. The application priority level table T100 is stored in the storage unit 12. The applications contained in the application priority level table T100 are the applications installed in the information processing apparatus 10.

In S102, the control unit 11 of the information processing apparatus 10 rearranges the applications displayed in the display image on the basis of the priority levels extracted in S101 in the sequence from the highest priority level. For example, the applications displayed in the display image are the audio application, the hands-free phone application and the navigation application, in which case the higher priority levels are allocated to the navigation application, the audio application and the hands-free phone application in this sequence.

In S103, the control unit 11 of the information processing apparatus 10 sets the highest priority level to an extraction function for displaying the running image in the functions contained in the applications. Each application has a plurality of functions, and the associated operation means images for implementing the function exists in respective functions. The operation means images are displayed in the running image of the application. The user manipulates the operation means images in the running image displayed on the display of the output unit 14 through the touch panel and other equivalent devices of the input device 14, and is thereby enabled to implement a desired function of the application. The operation about the operation means images for attaining the functions of the applications is not to display the overall operation means images in the running image but to display the operation means image associated with the function, having the higher priority level, of the application exhibiting the higher priority level. The priority levels are set to the respective functions of the application. Herein, the control unit 11 of the information processing apparatus 10 sets the highest priority level to the extraction function for extracting the function having the highest priority level as the operation means image of the function for being displayed in the running image to be extracted first. For example, the priority levels of the functions are settled such as 1, 2, 3, 4 and 5, of which the highest priority level is 5, and the control unit 11 of the information processing apparatus 10 sets 5 as the priority level of the extraction function. As for the priority levels of the functions, a function more desirable for being displayed in the running image has a higher priority level. The function having the higher priority level is a function that is more indispensable for the application having the function concerned.

FIG. 9 is a diagram illustrating an example of a function priority level table representing a relationship between the functions of the applications and the priority levels. A function priority level table T200 in FIG. 9 represents an associated relationship between the functions of the applications and the priority levels of the functions on a per application basis. For example, a priority level "5" is allocated to a "destination search" function of the navigation application. Each function is associated with information indicating whether the function is a traveling regulation target. The functions marked with "o" in a "traveling regulation target" field are functions associated with the operation means images disabled from being displayed in the running image during traveling of the vehicle 1. The functions marked with "–" in the "traveling regulation target" field are functions associated with the operation means images enabled to be displayed in the running image even during traveling of the vehicle 1. The function priority level table T200 is stored in the storage unit 12.

In S104, the control unit 11 of the information processing apparatus 10 sets the highest priority level to an extraction target application from which to extract the function that is displayed in the running image. The navigation application, the audio application and the hands-free phone application are sequenced from the highest priority level in this order, in which case the control unit 11 sets the navigation application as the extraction target application from which to extract the function that is displayed in the running image.

In S105, the control unit 11 of the information processing apparatus 10 extracts the function having the highest priority level of the function set in S103 or S114 with respect to the application set in S104 or S112. The control unit 11, when extracting the function, refers to the function priority level table T200 stored in the storage unit 12.

In S106, the control unit 11 of the information processing apparatus 10 checks whether the vehicle 1 mounted with the information processing apparatus 10 is currently traveling. The control unit 11 acquires, through the communication unit 15, information about whether the vehicle 1 is currently travelling. A determination about whether the vehicle 1 is currently travelling can be made by, e.g., acquiring rotations of wheels of the vehicle 1 and time variations of positions based on a Global Positioning System (GPS). When the vehicle 1 is currently travelling (S106; YES), the processing advances the processing to step S107. Whereas when the vehicle 1 is not currently travelling (S106; NO), the processing diverts to S109.

In S107, the control unit 11 of the information processing apparatus 10 refers to the function priority level table T200 stored in the storage unit 12, and thus determines whether the functions extracted in S105 contain the travelling regulation target function. In the function priority level table T200 of FIG. 9, the functions marked with "o" in the "travelling regulation target" field are defined as the travelling regulation target functions. When the extracted functions contain the travelling regulation target function (S107; YES), the processing advances to S108. Whereas when the extracted functions do not contain the travelling regulation target function (S107; NO), the processing diverts to S109.

In S108, the control unit 11 of the information processing apparatus 10 deletes the travelling regulation target function from the functions extracted in S105. This is because the operation means image associated with the travelling regulation target function is disabled from being displayed in the running image.

In S109, the control unit 11 of the information processing apparatus 10 determines whether a number of the extracted functions exceeds a predetermined maximum count. The predetermined maximum count is a maximum count of the operation means images that can be displayed in one display image like the whole image 101 in FIG. 5. When there are an increased number of operation means images contained in the running images displayed in the display image, e.g., such a possibility arises that the user gets confused due to time-consuming manipulations. When the user gets confused, there may be an anxiety about causing a hindrance against safety driving. Such being the case, a maximum value of the number of the operation means images to be displayed is predetermined for not causing the confusion of the user. The function exceeding the maximum value is deleted in the next step. When the number of the extracted functions exceeds the predetermined maximum value (S109; YES), the processing diverts to S115. Whereas when the number of the extracted functions is equal to or smaller than the predetermined maximum value (S109; NO), the processing advances to S110. The maximum value of the number of the operation means images to be displayed is, e.g., 10.

In S110, the control unit 11 of the information processing apparatus 10 determines whether a sum of the priority levels of the extracted functions exceeds a predetermined threshold value. Even when the number of the operation means images is equal to or smaller than the predetermined maximum value, there exists the possibility that the user gets confused with the operation means images all having the high priority levels. This being the case, when there are many operation means images having the high priority levels, the number of the operation means images is set smaller than the predetermined maximum count. For this setting, the control unit 11 calculates the sum of the priority levels of the extracted functions by referring to the function priority level table T200, and, when the sum of the priority levels exceeds the predetermined threshold value, the functions corresponding to the excess are deleted in the next step. When the sum of the priority levels of the extracted functions exceeds the predetermined threshold value (S110; YES), the processing diverts to S115. Whereas when the sum of the priority levels of the extracted functions is equal to or smaller than the predetermined threshold value (S110; NO), the processing advances to S111. The predetermined threshold value is, e.g., 40. Hereat, e.g., totally up to eight operation means images of the functions having the priority level "5" are allowed to be contained in the running image of the display image.

In S111, the control unit 11 of the information processing apparatus 10 determines whether the priority level of the present function extracting target application is lowest among the applications displayed in the display image. A high-or-low determination of the priority level of the application involves using a result of rearranging the sequenced priority levels of the applications as conducted in S102. When the priority level of the present function extracting target application is not lowest (S111; NO), the processing advances to S112. Whereas when the priority level of the present function extracting target application is lowest (S111; YES), the processing diverts to S113.

In S112, the control unit 11 of the information processing apparatus 10 sets the target application, from which to extract the function that is displayed in the running image, as the application having the high priority level next to the priority level of the present extracting target application. The control unit 11 determines the application having the high priority level next to the priority level of the present extracting target application by using the result of rearranging the sequenced priority levels of the applications as conducted in S102. Thereafter, the processing loops back to S105.

In S113, the control unit 11 of the information processing apparatus 10 determines whether the priority level of the function to be extracted is the lowest priority level. As described above, the priority levels of the functions are settled such as 1, 2, 3, 4 and 5, in which case the priority level "1" is the lowest priority level. When the priority level of the function to be extracted is not the lowest priority level (S113; NO), the processing advances to S114. Whereas when the priority level of the function to be extracted is the lowest priority level (S113; YES), the processing diverts to S116.

In S114, the control unit 11 of the information processing apparatus 10 sets the priority level of the function to be extracted for being displayed in the running image in the functions contained in the application, to a priority level lower by one step than the present priority level. For example, the control unit 11, when the priority level of the present function to be extracted is 4, sets the priority level of the function to be extracted to 3. Thereafter, the processing loops back to S104.

In S115, the control unit 11 of the information processing apparatus 10 deletes, from the extracted functions, the functions corresponding to the excess over the maximum count of the operation means images or the functions corresponding to an amount of how much the sum of the priority levels of the extracted functions exceeds the predetermined threshold value. The control unit 11 deletes the functions corresponding to the excess, and deletes the functions corresponding to the excess, with the result that the number of the extracted functions is equal to or smaller than the maximum count of the operation means images, and that the sum of the priority levels of the extracted functions is equal to or smaller than the predetermined threshold value.

In S116, the control unit 11 of the information processing apparatus 10 generates the display image including the running image containing the operation means image associated with the extracted function of each application, and displays the generated display image on the display of the output unit 14. The operation means images associated with the unextracted functions are not contained in the generated running image of the application. The running image containing the operation means image associated with the extracted function is thereby displayed corresponding to a combination of the applications to be displayed.

(Example of Operation Means Image)

Figure 10:
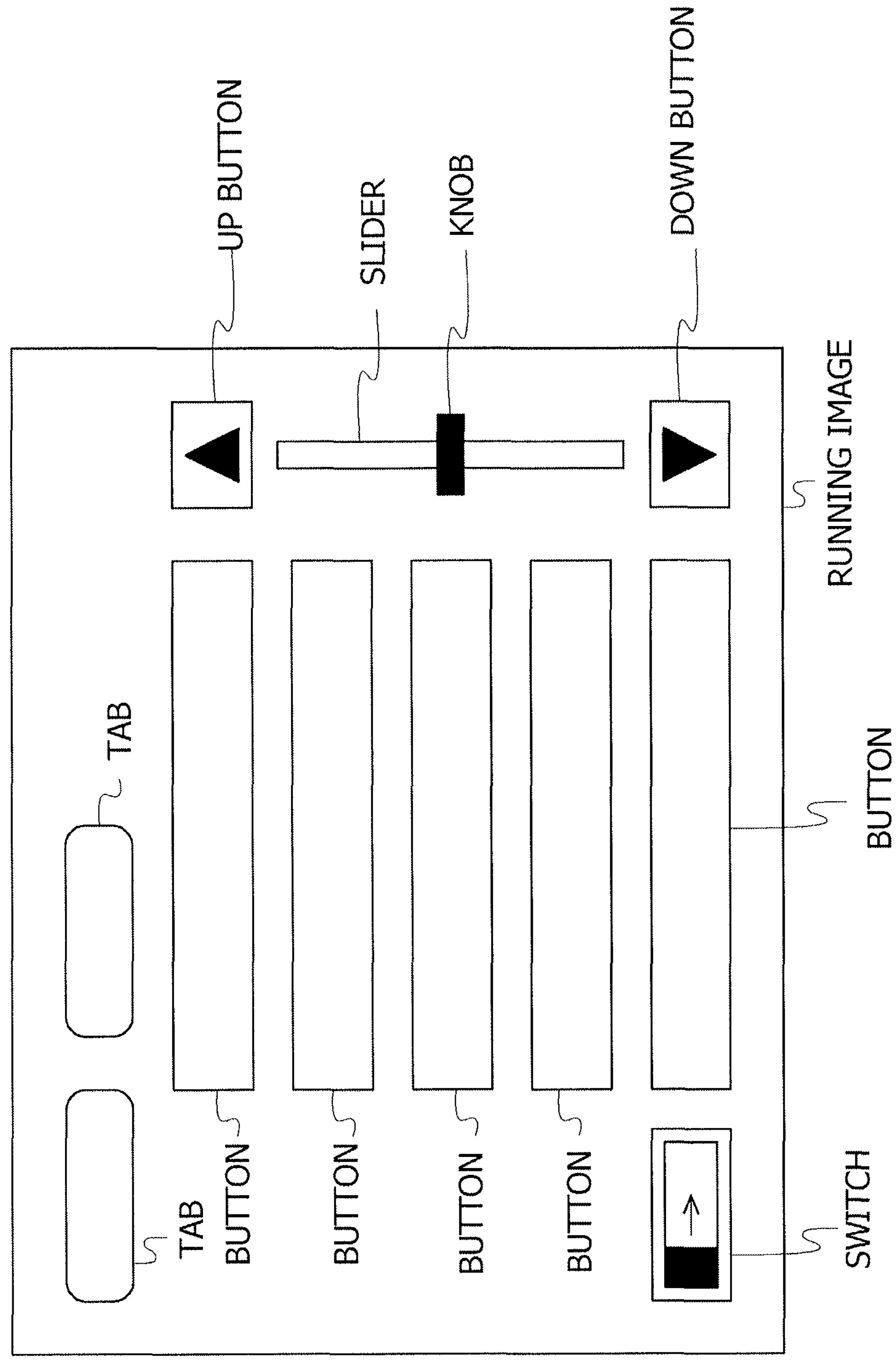
FIG. 10 is a diagram illustrating a specific example of the operation means images.

FIG. 10 is a diagram illustrating a specific example of the operation means image. As in FIG. 10, the operation means images contained in the running image are exemplified by tabs, buttons, a switch, a slider, an UP button and a down button. The tab is the operation means image for a switchover to another function and equivalent operations. The button is the operation means image for activating a predetermined function and other equivalent operations. The switch is the operation means image for an ON/OFF switchover of the function and equivalent operations by sliding a black quadrangle from left to right (alternatively from right to left). The slider is the operation means image for changing a display position on the screen and a numerical value of a sound volume and other equivalent values by sliding a knob up and down. The UP button is the operation means image for scrolling the displayed image upward and increasing the sound volume. The DOWN button is the operation means image for scrolling the displayed image downward and decreasing the sound volume. The operation means images are not limited to these images exemplified herein.

SPECIFIC EXAMPLE 1

Figure 11:
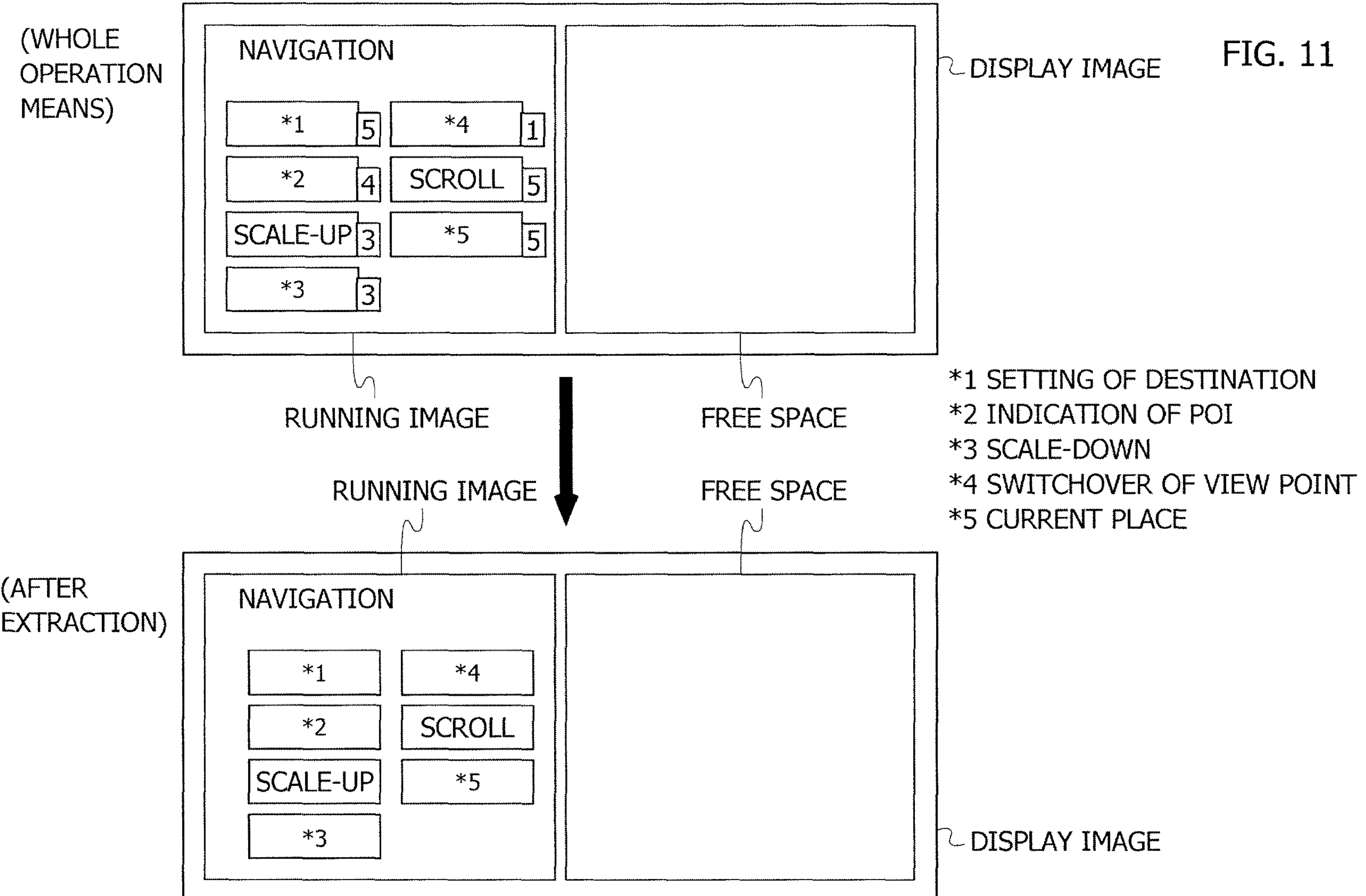
FIG. 11 is a diagram illustrating an example 1 of a display image containing the running images to be displayed based on the operation flow described above.

FIG. 11 is a diagram illustrating an example 1 of the display image containing the running images displayed based on the operation flow. Herein, the application currently started up is only the navigation application. An upper illustration of the display image in FIG. 11 depicts the running image containing the operation means images associated with all the functions (setting of destination, indication of Point of Interest (POI), scale-up, scale-down, switchover of view point, map scroll, and indication of current place) of the navigation application, and a free space. Numbers attached to right sides of the respective operation means images represent the priority levels of the functions. When the functions to be displayed are extracted based on the operation flow described above, the display image becomes as in a lower illustration of FIG. 11. Herein, an assumption is that "10" is the maximum value of the number of the displayable operation means images, and "50" is a threshold value of the sum of the priority levels of the functions. It is also assumed that the vehicle 1 remains stopped (not currently travelling). There are seven operation means images of the functions to be displayed, which are included in the navigation application, and the sum of the priority levels of the functions is "26", whereby the operation means images associated with all the functions included in the navigation application are herein displayed in the running image.

SPECIFIC EXAMPLE 2

Figure 12:
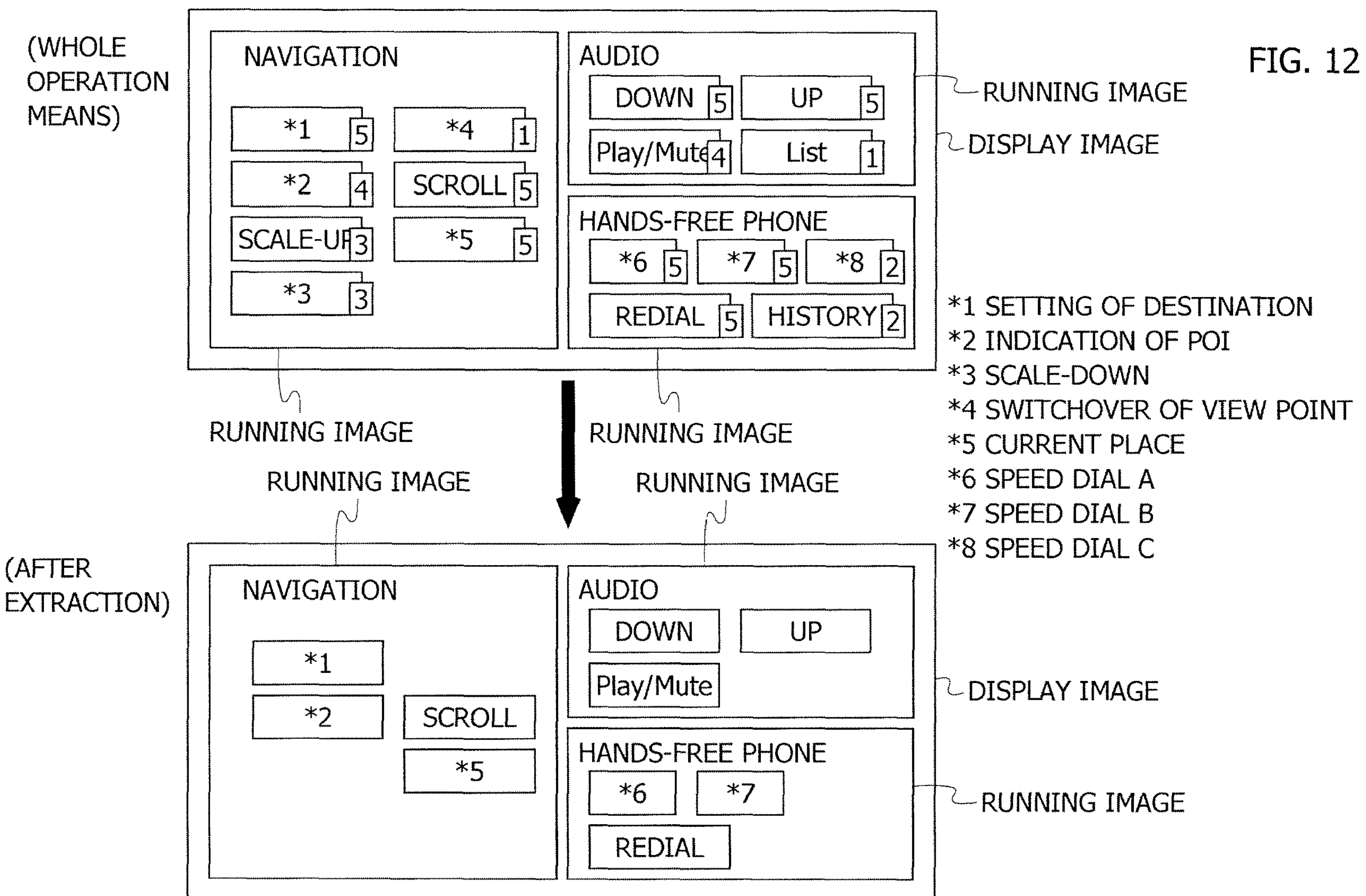
FIG. 12 is a diagram illustrating an example 2 of the display image containing the running images to be displayed based on the operation flow described above.

FIG. 12 is a diagram illustrating an example 2 of the display image containing the running images displayed based on the operation flow. Herein, the applications currently started up are the navigation application, the audio application and the hands-free phone application. An upper illustration of FIG. 12 depicts the running image of the navigation application, the running image of the audio application, and the running image of the hands-free phone application. The upper illustration of FIG. 11 also depicts the respective running images containing the operation means images associated with all the functions of the applications. Displayed in the navigation application are the operation means images associated with the respective functions such as the setting of destination, the indication of POI, the scale-up, the scale-down, the switchover of view point, the map scroll, and the indication of current place. Displayed in the audio application are the operation means images associated with the functions such as track UP, track DOWN, Play/Mute, and List call. Displayed in the hands-free phone application are the operation means images associated with the functions such as speed dial A, speed dial B, speed dial C, redial, and history call. The numbers attached to the right sides of the respective operation means images represent the priority levels of the functions. When the functions to be displayed are extracted based on the operation flow described above, the display image becomes as in a lower illustration of FIG. 12. Herein, the assumption is that "10" is the maximum value of the number of the displayable operation means images, and "50" is the threshold value of the sum of the priority levels of the functions. A lower illustration of FIG. 12 depicts the running image of the navigation application, which contains only the operation means images associated with the functions such as the setting of destination, the indication of POI, the map scroll, and the indication of current place. The lower illustration of FIG. 12 also depicts the running image of the audio application, which contains only the track UP, the track DOWN, and the Play/Mute. In the hands-free phone application, there are displayed only the operation means images associated with the speed dial A, the speed dial B and the redial. Herein, the number of the operation means images contained in the display image is “10”, and the sum of the priority levels of the functions to be displayed is “48”. The running images of the audio application and the hands-free phone application are displayed, whereby the number of the operation means images to be displayed in the running image of the navigation application decreases as compared with the example of FIG. 11.

SPECIFIC EXAMPLE 3

Figure 13:
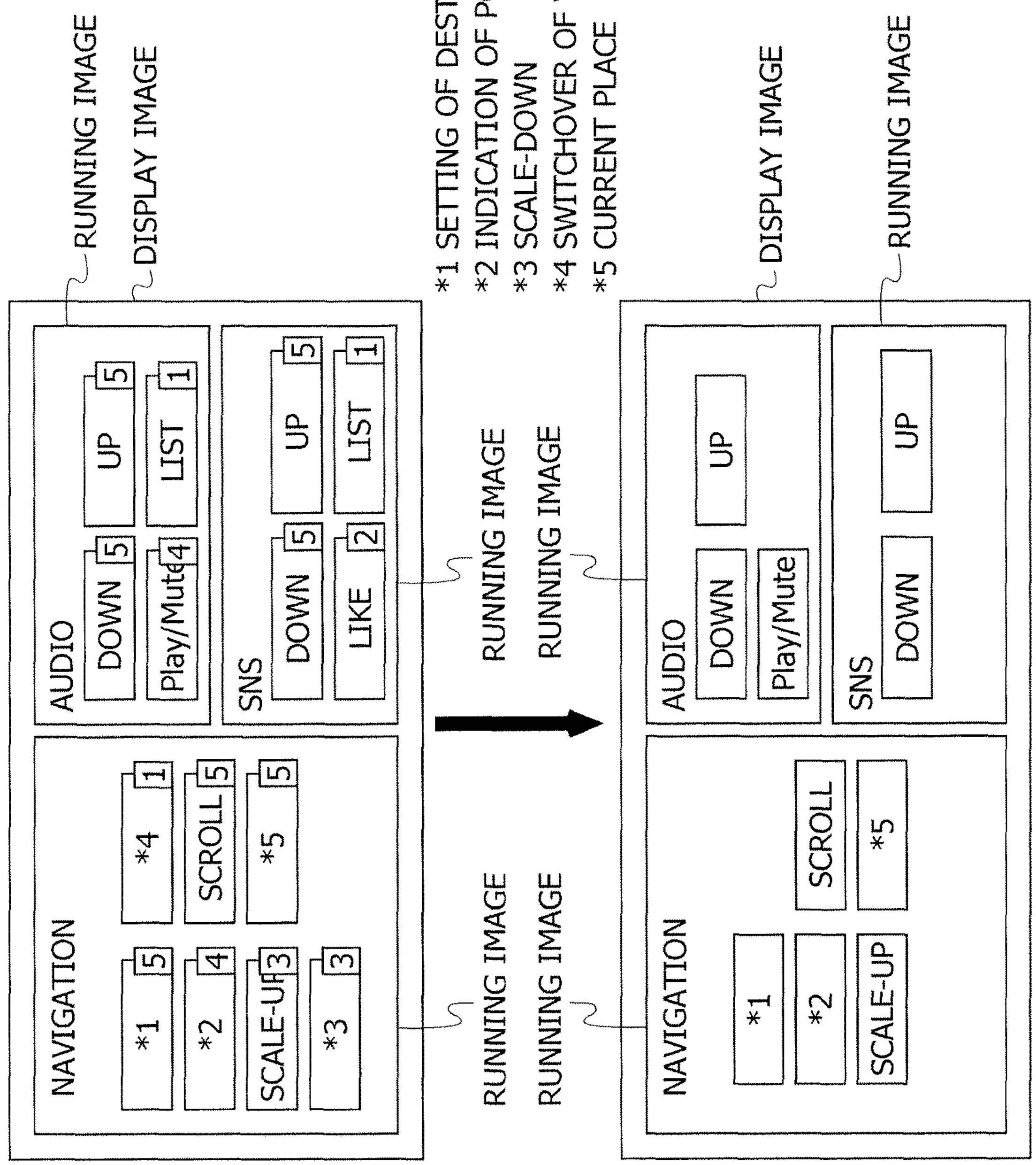
FIG. 13 is a diagram illustrating an example 3 of the display image containing the running images to be displayed based on the operation flow described above.

FIG. 13 is a diagram illustrating an example 3 of the display image containing the running images displayed based on the operation flow. Herein, the applications currently started up are the navigation application, the audio application and the SNS application. An upper illustration of FIG. 13 depicts the display image containing the running images of the navigation application, the audio application and the SNS application. In the upper illustration of FIG. 13, the operation means images associated with all the functions of the applications are displayed the running images. The navigation application and the audio application are the same as in the example of the upper illustration of FIG. 12. The operation means images associated with functions such as content UP, content DOWN, Like, and list call are displayed in the SNS application. The numbers attached to the right sides of the respective operation means images represent the priority levels of the functions. When the functions to be displayed are extracted based on the operation flow described above, the display image becomes as in a lower illustration of FIG. 13. Herein, the assumption is that “10” is the maximum value of the number of the displayable operation means images, and “50” is the threshold value of the sum of the priority levels of the functions. A lower illustration of FIG. 13 depicts the running image of the navigation application, which contains only the operation means images associated with the functions such as the setting of destination, the indication of POI, the map scroll, the indication of current place and the scale-up. The lower illustration of FIG. 12 depicts the running image of the audio application, which contains only the track UP, the track DOWN, and the Play/Mute. The lower illustration of FIG. 13 also depicts the running image of the audio application, which contains only the operation means images associated with the track UP, the track DOWN, and the Play/Mute. Only the operation means images associated with the content UP and the content DOWN are displayed in the SNS application. Herein, the number of the operation means images contained in the display image is “10”, and the sum of the priority levels of the functions to be displayed is “44”. In comparison with the example in FIG. 12, the hands-free phone application is replaced by the SNS application, resulting in a change in number of the operation means images to be displayed in the running image of the navigation application. In other words, with the change of the applications to be displayed together, the operation means images to be displayed in the respective running images are properly varied.

(Others)

In the discussion made above, the information processing apparatus 10 is defined as the apparatus mounted on the vehicle, and, however, the information processing apparatus 10 may also be an apparatus (instanced by a smartphone and a tablet terminal) not mounted on the vehicle 1. In this case, the information processing apparatus 10 may not be connected to the audio system 20, the air conditioning system 30, the navigation system 40 and other equivalent systems of the vehicle 1.

The examples of the configurations and the operational examples described above are not limited to the configurations described above but can be partly omitted, modified and combined within the range that does not deviates from the gist of the present invention.

(Operation and Effect of Embodiment)

The control unit 11 of the information processing apparatus 10 displays the display image containing the running images of one or more applications on the display of the output unit 14. The control unit 11 restricts the number of the operation means images contained in the running image so that the total number of the operation means images contained in the running image does not exceed the predetermined maximum count. The control unit 11 restricts the operation means images to be displayed in the running image so that the sum of the priority levels of the functions associated with the operation means images contained in the running means does not exceed the predetermined threshold value. The information processing apparatus 10 enables the operation means images associated with the functions having the high priority levels to be displayed in the display image in which the running images of one or more applications are displayed. The information processing apparatus 10 also enables the variations of the operation means images to be displayed, corresponding to the categories of the applications that are displayed together in the display image. The information processing apparatus 10 can set the number of the operation means images to be displayed so as not to exceed the predetermined maximum value even when varying the applications to be displayed together, and can properly extract the operation means images to be displayed on the basis of the priority levels. The information processing apparatus 10 mounted on the vehicle 1 enables the operation means images set as the travel regulation targets not to be displayed during travelling. The information processing apparatus 10 displays the proper operation means images, corresponding to the applications to be displayed together and a state of the vehicle 1, thereby contributing to an improvement of safety driving of the user.

<Non-Transitory Recording Medium>

A program making a computer, other machines and apparatuses (which will hereinafter be referred to as the computer and other equivalent apparatuses) attain any one of the functions, can be recorded on a non-transitory recording medium readable by the computer and other equivalent apparatuses. The computer and other equivalent apparatuses are made to read and run the program on this non-transitory recording medium, whereby the function thereof can be provided.

Herein, the non-transitory recording medium readable by the computer and other equivalent apparatuses connotes a non-transitory recording medium capable of accumulating information instanced by data, programs and other equivalent information electrically, magnetically, optically, mechanically or by chemical action, which can be read from the computer and other equivalent apparatuses. In these non-transitory recording mediums, components instanced by the CPU and the memory configuring the computer are provided, and the CPU may be made to run the program.

Among these non-transitory recording mediums, the mediums removable from the computer and other equivalent apparatuses are exemplified by a flexible disc, a magneto-optic disc, a CD-ROM, a CD-R/W, a DVD, a DAT, an 8 mm tape, and a memory card.

A hard disc, a Read-Only Memory (ROM) and other equivalent recording mediums are given as the non-transitory recording mediums fixed within the computer and other equivalent apparatuses.

DESCRIPTION OF THE REFERENCE NUMERALS AND SYMBOLS

1 vehicle
2 network
10 information processing apparatus
11 control unit
12 storage unit
13 input unit
14 output unit
15 communication unit
20 audio system
30 air conditioning system
40 navigation system

What is claimed is:

1. An information processing apparatus comprising:

a memory;

a processor programmed to execute a process stored in the memory, the process including generating a display image including running images of a plurality of applications, each of the applications containing one or more operation images that receive user input operations, attaining predetermined functions;

a display configured to display the display image generated by the control unit; and an input device configured to accept an operation performed on the operation image contained in the running image, wherein the processor is further programmed to extract the functions associated with the operation images and contained in the running image of the application, based on priority levels of the functions associated with the operation means images contained in the plurality of applications, and generate the display image including the running image containing the operation images associated with the extracted functions, a number of the functions the processor is programmed to extract is equal to or smaller than a predetermined maximum count, and the processor is further programmed to delete, from the functions which are extracted, functions corresponding to an amount of how much the sum of the priority levels of the functions which are extracted exceeds a predetermined threshold value.

2. The information processing apparatus according to claim 1, wherein the processor is further programmed to extract the functions associated with the operation images equal to or smaller than the predetermined maximum count and contained in the running image of the application, based on the priority levels of the functions associated with the operation means images contained in the plurality of applications and priority levels of the applications.

3. The information processing apparatus according to claim 1, wherein the information processing apparatus is mounted on a vehicle, and the processor is further programmed to determine the operation images not contained in the running image in the operation images associated with the extracted functions, based on a state of the vehicle.

4. An information processing method by which a computer executes:

generating a display image including running images of a plurality applications each containing one or more operation images that receive user input operations, attaining predetermined functions;

extracting the functions associated with the operation images and contained in the running image of the application, based on priority levels of the functions associated with the operation images contained in the plurality of applications, and generating the display image including the running image containing the operation images associated with the extracted functions, wherein a number of the functions extracted is equal to or smaller than a predetermined maximum count; and deleting, from the functions which are extracted, functions corresponding to an amount of how much the sum of the priority levels of the functions which are extracted exceeds a predetermined threshold value.

5. A non-transitory computer readable medium recorded with an information processing program to make a computer execute:

generating a display image including running images of a plurality of applications each containing one or more operation images that receive user input operations, attaining predetermined functions;

extracting the functions associated with the operation means images and contained in the running image of the application, based on priority levels of the functions associated with the operation images contained in the plurality of applications, and generating the display image including the running image containing the operation images associated with the extracted functions, wherein a number of the functions extracted is equal to or smaller than a predetermined maximum count; and deleting, from the functions which are extracted, functions corresponding to an amount of how much the sum of the priority levels of the functions which are extracted exceeds a predetermined threshold value.

6. The information processing apparatus according to claim 2, wherein the information processing apparatus is mounted on a vehicle, and the processor is further configured to determine the operation images not contained in the running image in the operation images associated with the extracted functions, based on a state of the vehicle.

* * * * *